United States Patent
Park et al.

(10) Patent No.: US 10,168,183 B2
(45) Date of Patent: Jan. 1, 2019

(54) METHOD AND SYSTEM FOR DETERMINING FAILURE WITHIN RESOLVER

(71) Applicant: Hyundai Motor Company, Seoul (KR)

(72) Inventors: Hyun Min Park, Gyeonggi-do (KR); Tae Young Chung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 972 days.

(21) Appl. No.: 14/570,984

(22) Filed: Dec. 15, 2014

(65) Prior Publication Data

US 2016/0011267 A1    Jan. 14, 2016

(30) Foreign Application Priority Data

Jul. 8, 2014 (KR) .......... 10-2014-0085422

(51) Int. Cl.
| | | |
|---|---|---|
| *G01D 5/14* | (2006.01) | |
| *G01D 5/20* | (2006.01) | |
| *G01D 5/244* | (2006.01) | |

(52) U.S. Cl.
CPC ............ *G01D 5/14* (2013.01); *G01D 5/204* (2013.01); *G01D 5/24466* (2013.01)

(58) Field of Classification Search
CPC ....... G01D 5/14; G01D 5/204; G01D 5/24466
USPC .......................................................... 702/58
See application file for complete search history.

(56) References Cited

U.S. PATENT DOCUMENTS

| | | | |
|---|---|---|---|
| 6,958,620 B1 | 10/2005 | Kozuki | |
| 7,456,603 B2 | 11/2008 | Kanekawa et al. | |
| 2005/0162292 A1* | 7/2005 | Kanekawa | B60T 8/885 341/111 |
| 2007/0029955 A1 | 2/2007 | Kanekawa et al. | |
| 2008/0052562 A1* | 2/2008 | Kameya | G01D 5/24461 714/47.1 |
| 2011/0106469 A1 | 5/2011 | Kim et al. | |
| 2016/0202088 A1* | 7/2016 | Kishimoto | G01D 5/204 324/207.25 |

FOREIGN PATENT DOCUMENTS

| | | |
|---|---|---|
| JP | 2006-349561 A | 12/2006 |
| JP | 2007-052001 A | 3/2007 |
| KR | 10-0593116 B1 | 6/2006 |
| KR | 2011-0048977 A | 5/2011 |
| KR | 2013-0029195 A | 3/2013 |
| KR | 2013-0057842 A | 6/2013 |

* cited by examiner

*Primary Examiner* — Michael Nghiem
*Assistant Examiner* — Peter Ngo
(74) *Attorney, Agent, or Firm* — Mintz Levin Cohn Ferris Glovsky and Popeo, P.C.; Peter F. Corless

(57) ABSTRACT

A system and a method for determining a failure within a resolver are provided. The method includes detecting signals output from the resolver. In addition, an average value and a deviation value of the detected signals are calculated. Further, the controller is configured to determine a disconnection or a short circuit of the resolver using the calculated average value and deviation value.

16 Claims, 10 Drawing Sheets

METHOD AND SYSTEM FOR DETERMINING FAILURE WITHIN RESOLVER

CROSS-REFERENCE TO RELATED APPLICATION

This application is based on and claims the benefit of priority to Korean Patent Application No. 10-2014-0085422, filed on Jul. 8, 2014, the disclosure of which is incorporated herein in its entirety by reference.

TECHNICAL FIELD

The present disclosure relates to a system and method for determining a failure within a resolver, and more particularly, to a technology for determining a failure within a resolver using a microcomputer and without using a resolver to digital converter.

BACKGROUND

A driving motor for a vehicle uses a resolver to detect a velocity of the driving motor and an angle of a rotor. A signal detected by the resolver is transmitted to a microcomputer via a resolver to digital converter. The microcomputer is configured to determine a failure of a signal line of the resolver via the signal, which is transmitted via the resolver to digital converter. In other words, a system configured to determine a failure in a resolver according to a related art recognizes when the system receives a sin/cos monitored signal (sin/cos signal) and the received sin or cos signal maintains about 0V or about 5V for at least a predetermined time as a disconnection failure of a sin or cos signal line.

The system configured to determine a failure in a resolver according to a related art needs the driving motor to set a time that determines the failure to be sufficiently long in the vicinity of (e.g., near) the corresponding angle, or may be implemented to operate only at a predetermined velocity or greater. Moreover, when the time that senses the failure is set to greater than a particular time, even though a real failure occurs within the resolver, an additional failure (e.g., an overcurrent failure, or the like) may cause a power module failure and a vehicle driving error since a current control for the driving motor is performed using a wrong angle of a rotor of the motor until the failure is determined.

In addition, the system for determining a failure within a resolver according to the related art may not determine the failure in the signal line of the resolver in a low velocity driving section of the driving motor since the system that determines a failure within a resolver according to the related art may determine the failure in the signal line of the resolver when the driving motor operates at the predetermined velocity or greater.

SUMMARY

An aspect of the present disclosure provides an apparatus and a method for determining a resolver failure due to possible disconnections/short circuits by determining the failure using a microcomputer on a control board without a resolver to digital converter and determining, by a failure sensor, whether a failure is a mono signal average value or greater and whether the failure is a Lissajous value or greater and whether the failure is a mono signal deviation value or greater.

According to an exemplary embodiment of the present disclosure, a method for determining a failure in a resolver may include: detecting signals output from the resolver; calculating an average value and a deviation value of the detected signals; and determining a disconnection or a short circuit of the resolver using the calculated average value and deviation value. The output signals may be received by a microcomputer on a control board. The calculated average value and deviation value may determine whether the failure is a mono signal average value or greater, whether the failure is a Lissajous value or greater, and whether the failure is a mono signal deviation value or greater.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
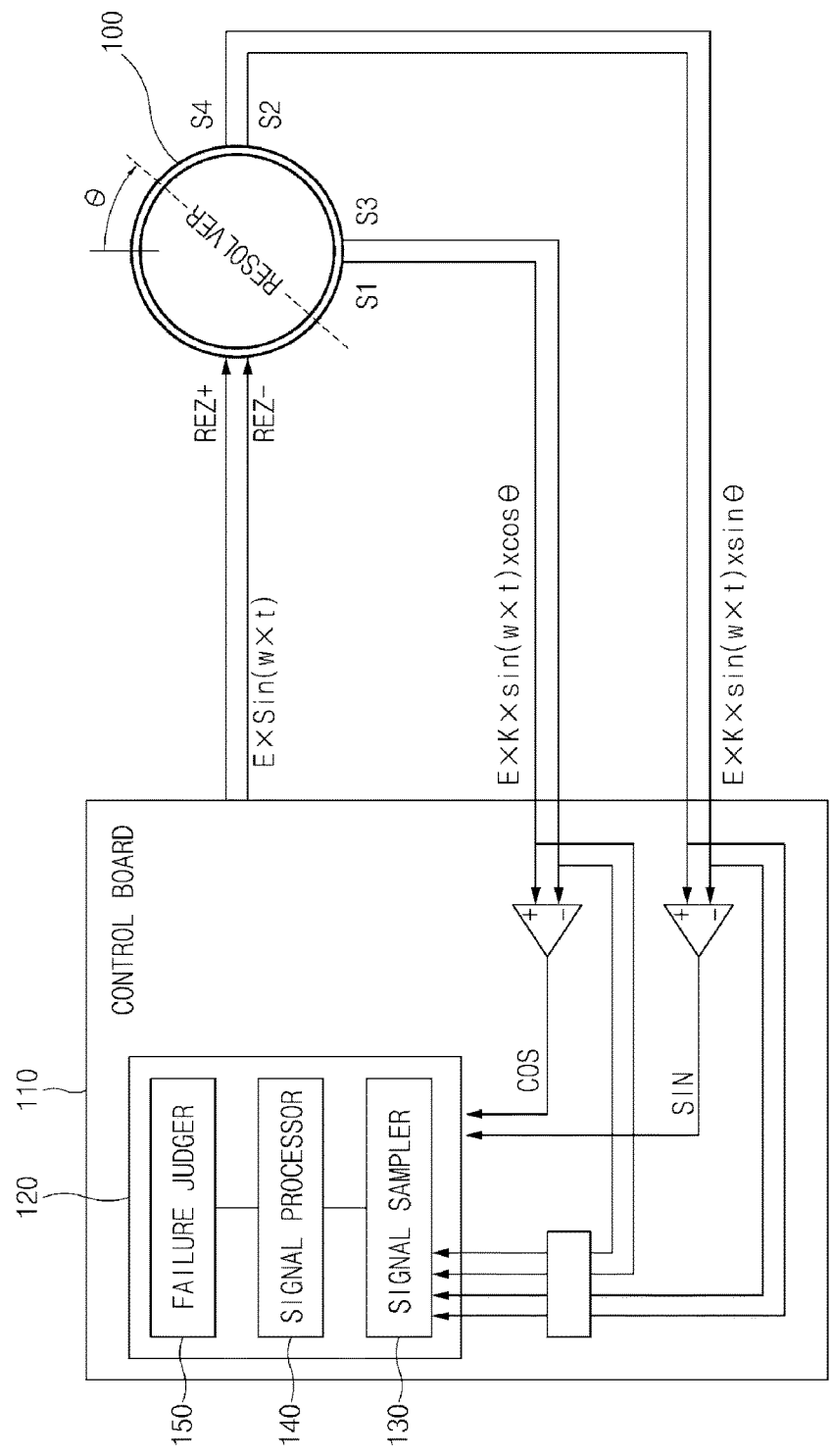
FIG. 1 is an exemplary configuration diagram schematically showing a resolver of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The above-mentioned objects, features, and advantages will become obvious from the detailed description which is described below in detail with reference to the accompanying drawings. Therefore, those skilled in the art to which the present disclosure pertains may easily practice a technical idea of the present disclosure. Further, in describing the present disclosure, in the case in which it is judged that a detailed description of a well-known technology associated with the present disclosure may unnecessarily make unclear the gist of the present disclosure, it will be omitted. Hereinafter, exemplary embodiments of the present disclosure will be described in detail with reference to the accompanying drawings.

FIG. 1 is an exemplary configuration diagram schematically showing a resolver of a vehicle according to an exemplary embodiment of the present disclosure.

Referring to FIG. 1, a configuration diagram of a pure electric vehicle (EV) or a hybrid electric vehicle (HEV) including a resolver may include a resolver 100 and a control board (e.g., controller) 110. The control board 110 (e.g., controller) may include a microcomputer 120 (e.g., a central processing unit (CPU, read only memory (ROM), random access memory (RAM)). Further, the control board 110 (e.g., controller) may be configured to execute the processes described herein. The microcomputer 120 may include a signal sampler 130, a signal processor 140, and a failure sensor 150 to be operated with software (SW). The resolver 100 may be configured to output a plurality of output signals. The output signals may include S1 (COS+), S2 (SIN+), S3 (COS−), and S4 (SIN−).

The signal sampler 130 may be configured to receive the four output signals. Further, the signal sampler may be configured to generate COS_Diff(COS) and SIN_Diff(SIN) signals, which may differential values, and transmit a total of six output signals (e.g., the plurality of output signals and the generated signals) to the microcomputer 120. The signal sampler 130 also may be configured to extract position information regarding a rotor from the output signals using and excitation signal (E×sin(w×t)).

The signal processor 140 may be configured to process the sampled six output signals to determine the failure. In other words, the signal processor 140 may be configured to calculate a Lissajous value (e.g., sqrt(COS^2+SIN^2)) using the COS_Diff(COS) and SIN_Diff(SIN) signals and a real time average value and a deviation value of the COS_Diff (COS) and SIN_Diff(SIN) signals.

Further, the signal processor 140 may be configured to calculate an average value and a deviation value of the remaining four output signals (e.g., S1 (COS+), S2 (SIN+), S3 (COS−) and S4 (SIN−)) and a deviation value of S1 to S2, S1 to S4, S2 to S3, and S3 to S4 signals. In other words, the signals calculated by the signal processor 140 may include the Lissajous average value, the Lissajous deviation value, the S1 average and deviation values, the S2 average and deviation values, the S3 average and deviation values, the S4 average and deviation values, the S1 to S2 deviation values, the S1 to S4 deviation values, the S2 to S3 deviation values, and the S3 to S4 deviation values.

The failure sensor 150 may be configured to determine a disconnection/short circuit and a transformation ratio of the resolver using the average values and the deviation values of the ten signals calculated by the signal processor. Further, the failure sensor 150 may be configured to transmit a motor control terminating request signal to a motor controller when a failure condition is satisfied and the failure is determined.

Figure 2:
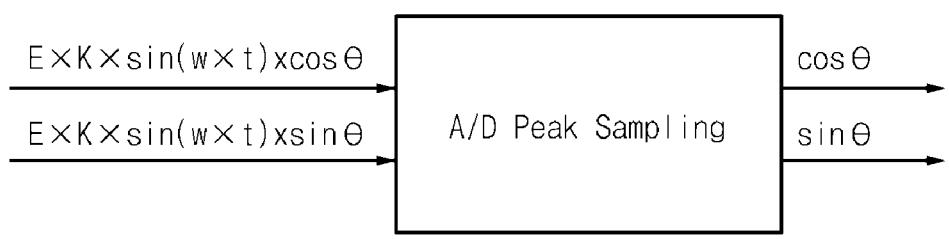
FIG. 2 is an exemplary diagram showing a signal sampler according to an exemplary embodiment of the present disclosure.

FIG. 2 is an exemplary diagram showing a signal sampler according to an exemplary embodiment of the present disclosure.

Referring to FIG. 2, the signal sampler 130 may be configured to receive the four output signals, which may include S1 (COS+), S2 (SIN+), S3 (COS−) and S4 (SIN−), from the resolver. Further, the signal sampler 130 may be configured to generate COS_Diff(COS) and SIN_Diff(SIN) signals, which may be differential values, and transmit a total of six output signals to the microcomputer. In particular, the four output signals, which include E×K×sin(w×t)× cos θ and E×K×sin(w×t)×sin θ signals, are analog to digital (A/D) peak sampled, which make it possible to additionally generate the COS_Diff(COS) and SIN_Diff(SIN) signals which may be the differential values.

Figure 3:
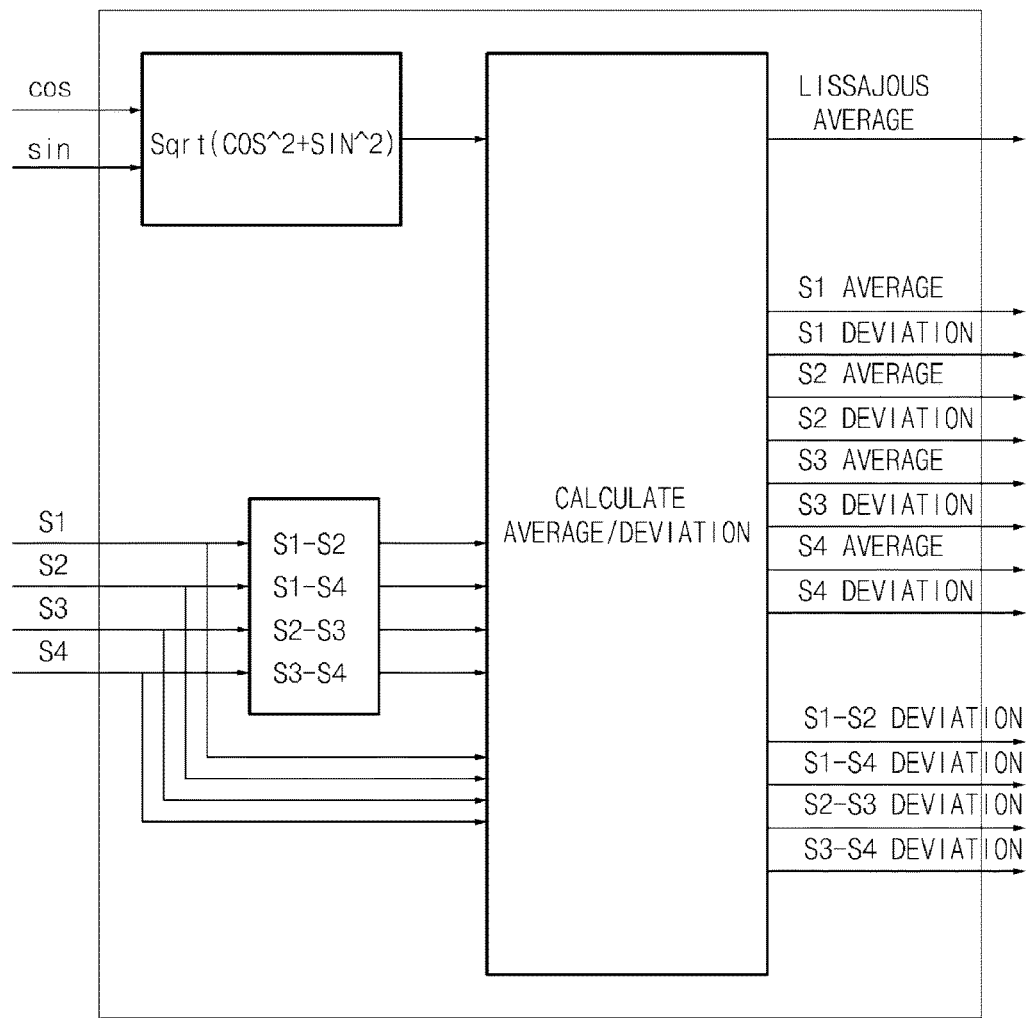
FIG. 3 is an exemplary diagram showing a signal processor according to an exemplary embodiment of the present disclosure.

FIG. 3 is an exemplary diagram showing a signal processor according to an exemplary embodiment of the present disclosure. Referring to FIG. 3, the signal processor 140 may be configured to process the sampled six output signals to determine the failure. In other words, the signal processor 140 may be configured to calculate a Lissajous value (e.g., sqrt(COS^2+SIN^2)) using the COS_Diff(COS) and SIN_Diff(SIN) signals and a real time average value and a deviation value of the two output signals. In this specification, the real time average value and the deviation value are defined as a Lissajous average value and a Lissajous deviation value, respectively.

Additionally, the signal processor 140 may be configured to calculate an average value and a deviation value of each of the remaining four output signals (e.g., S1(COS+), S2(SIN+), S3(COS−) and S4(SIN−)) signals and a deviation value of S1 to S2, S1 to S4, S2 to S3, and S3 to S4 signals. In other words, the signals calculated by the signal processor 140 may include the Lissajous average value, the Lissajous deviation value, the S1 average and deviation values, the S2 average and deviation values, the S3 average and deviation values, the S4 average and deviation values, the S1 to S2 deviation values, the S1 to S4 deviation values, the S2 to S3 deviation values, and the S3 to S4 deviation values.

Figure 4:
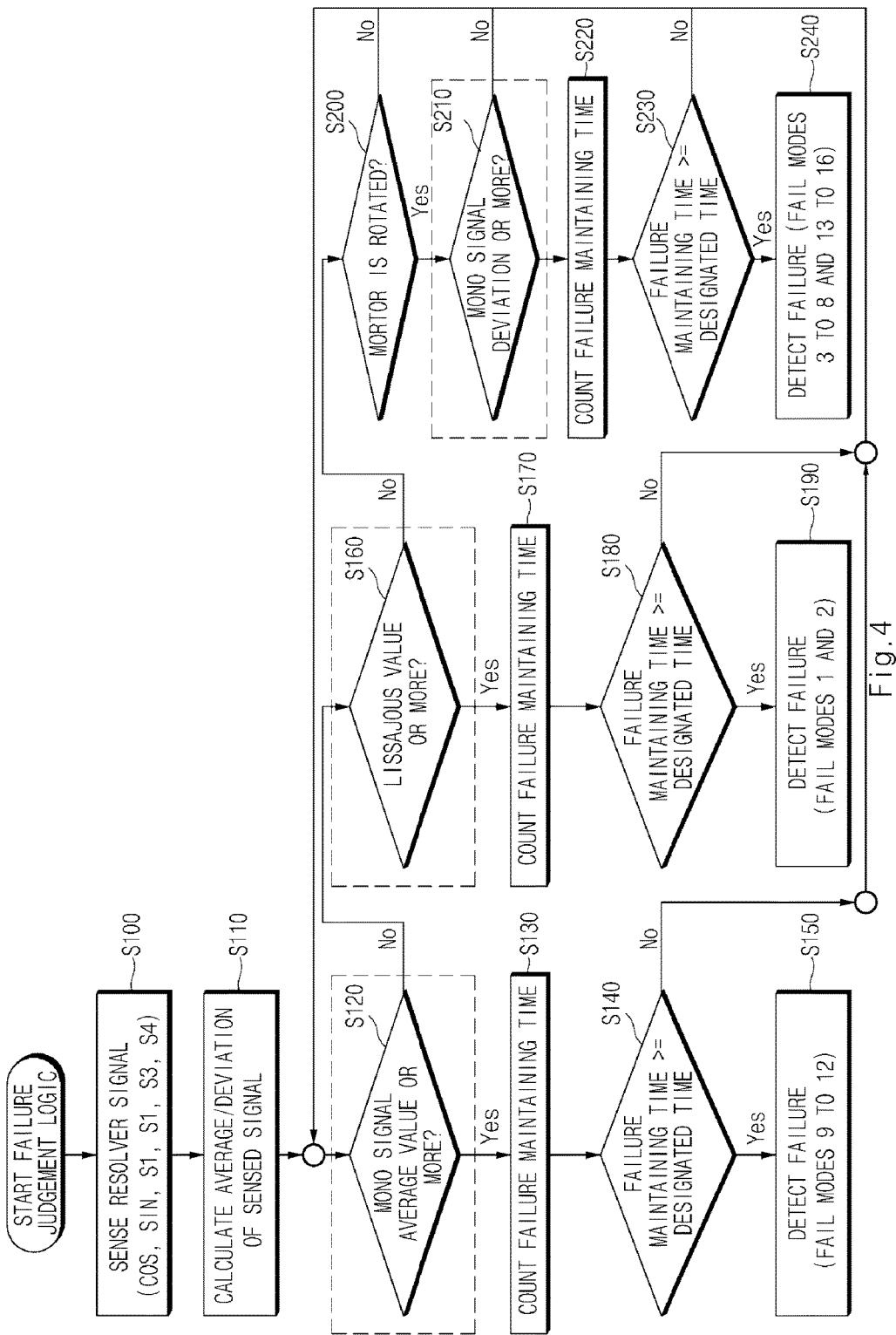
FIG. 4 is an exemplary flow chart showing a method for determining a failure in a resolver according to an exemplary embodiment of the present disclosure.

FIG. 4 is an exemplary flow chart showing a method for determining a failure in a resolver according to an exemplary embodiment of the present disclosure.

Referring to FIG. 4, the failure sensor may be configured to determine a disconnection, a short circuit or a transformation ratio of the resolver based on thirteen average values and deviation values calculated by the signal processor. In other words, the failure sensor may be configured to sequentially determine whether the failure is a mono signal average value or greater, whether the failure is a Lissajous value or greater, and whether the failure is a mono signal deviation value or greater in accordance with the following flow chart. When the resolver is not in a failure state, the output signals such as S1, S2, S3 and S4 may be within a predetermined range. However, when the resolver is in the failure state, the output signals may exceed (e.g., not within) the predetermined range.

A method for diagnosing the mono signal average value or greater by the failure sensor may include determining whether a short circuit occurs between the excitation signal and the output signal of the resolver. A method for diagnosing the Lissajous value or more may include determining whether the Lissajous value (e.g., sqrt(COS^2+SIN^2)) has a predetermined value using the output signal (e.g., COS or SIN signal) of the resolver. A method for diagnosing the mono signal deviation value or greater may include determining whether the SIN signal value maintains a predetermined value when the motor is rotated. Specifically, the signal sampler may be configured to detect the output signals of the resolver (S100). Further, the signal processor may be configured to calculate an average value and a deviation value of the detected signals (S110).

The failure sensor may then be configured to determine whether an average value (e.g., the S1 average value, the S2 average value, the S3 average value, or the S4 average value) of a mono signal is a designated average value level or greater (S120). In other words, the average value level may represent a normal level, and when the average value is the designated average value level or greater may represent when the average value is beyond a range of the normal level (e.g., level where no failure occurs).

When the mono signal average value is the designated average value level or more, a failure maintaining time may be measured (S130). In particular, the failure maintaining time may represent a time when the failure is maintained after the failure is detected in the respective failure modes. The measuring of the failure maintaining time may be used to determine the failure by comparing the measured failure maintaining time with a time when a monitored signal becomes the real average value level or greater when the monitored signal temporarily maintains the designated average value level or greater by a noise of the signal.

In addition, whether the failure maintaining time is equal to or greater than the designated time may be determined (S140). When the failure maintaining time is equal to or greater than the designated time, failure may be determined (e.g., failure modes 9 to 12) (S150). In particular, a specific method for determining the failure will be described in detail in FIG. 6.

When the mono signal average value is the designated average value level or less (e.g., within a normal level), the Lissajous average value may be compared to a designated Lissajous value level to determine whether it is the designated Lissajous value level or greater (S160). In particular, when the mono signal average value is a designated level 1 or greater, or a designated level 2 or less, the mono signal average value may form a predetermined band and when the mono signal average value is within the predetermined band, it may be normal.

Further, when the Lissajous average value is a designated Lissajous value level or greater, the failure maintaining time may be measured (S170). Whether the failure maintaining time is equal to or greater than the designated time may be determined (S180). When the failure maintaining time is equal to or greater than the designated time, a failure may be determined (e.g., failure modes 1 to 2) (S190). In particular, a specific method for determining the failure will be described in detail in FIG. 7.

When the Lissajous average value is the designated Lissajous value level or less (e.g., within the normal level), whether the motor is rotated may be determined (S200). Further, whether the mono signal deviation value is a designated deviation value level or more may be determined (S210). When the mono signal deviation value is the designated deviation value level or greater, the failure maintaining time may be measured (S220). Whether the failure maintaining time is equal to or greater than the designated time may be determined (S230).

When the failure maintaining time is equal to or greater than the designated time, a failure may be determined (e.g., failure modes 3 to 8 and 13 to 16) (S240). In particular, a specific method for determining the failure will be described in detail in FIG. 8. When the mono signal deviation value is the designated deviation value level or less, whether the mono signal average value is the designated average value level or greater may be determined again.

Figure 5:
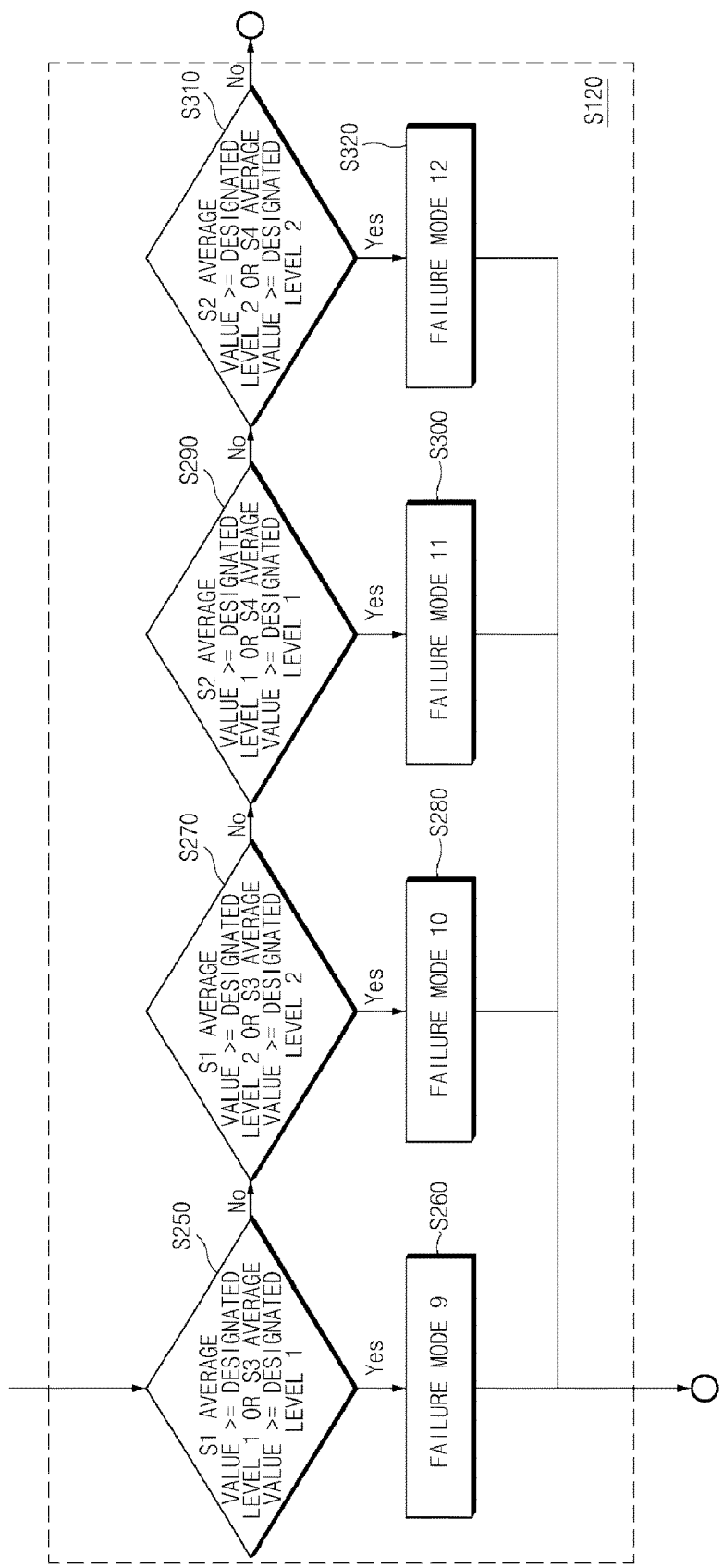
FIG. 5 is an exemplary flow chart showing a sequence for determining a failure based on a mono signal average value of the method for determining a failure in a resolver according to an exemplary embodiment of the present disclosure.

FIG. 5, which is an exemplary flow chart showing a sequence for determining a failure based on a mono signal average value of the method for determining a failure in a resolver according to an exemplary embodiment of the present disclosure, specifically describes S120 as shown in FIG. 4.

Referring to FIG. 5, when the mono signal average value is the designated average value level or greater, whether the failure maintaining time is equal to or greater than the designated time may be determined. When the failure maintaining time is equal to or greater than the designated time, a failure may be determined (e.g., failure modes 9 to 12).

Specifically, whether the mono signal average value is the designated average value level or greater may be determined as follows. Whether an S1 average value is greater than or equal to a designated level 1, or whether an S3 average value is greater than or equal to the designated level 1 may be determined (S250). Accordingly, when the S1 average value is greater than or equal to the designated level 1, and the S3 average value is greater than or equal to the designated level 1, the failure may be determined (e.g., failure mode 9) (S260).

Further, when the S1 average value is less than the designated level 1 and the S3 average value is less than the designated level 1, whether the S1 average value is less than or equal to a designated level 2 and whether the S3 average value is less than or equal to the designated level 2 may be determined (S270). Accordingly, when the S1 average value is less than or equal to the designated level 2, and the S3 average value is less than or equal to the designated level 2, the failure may be determined (a failure mode 10) (S280).

When the S1 average value is greater than the designated level 2 and the S3 average value is greater than the designated level 2, whether or not an S2 average value is greater than or equal to the designated level 1 and whether an S4 average value is greater than or equal to the designated level 1 may be determined (S290). Accordingly, when the S2 average value is greater than or equal to the designated level 1, and the S4 average value is greater than or equal to the designated level 1, the failure may be determined (e.g., failure mode 11) (S300).

When the S2 average value is less than the designated level 1 and the S4 average value is less than the designated level 1, whether the S2 average value is less than or equal to the designated level 2 and whether the S4 average value is less than or is equal to the designated level 2 may be determined (S310). According, when the S2 average value is less than or equal to the designated level 2, and the S4 average value is less than or equal to the designated level 2, the failure may be determined (e.g., failure mode 12) (S320).

Figure 6:
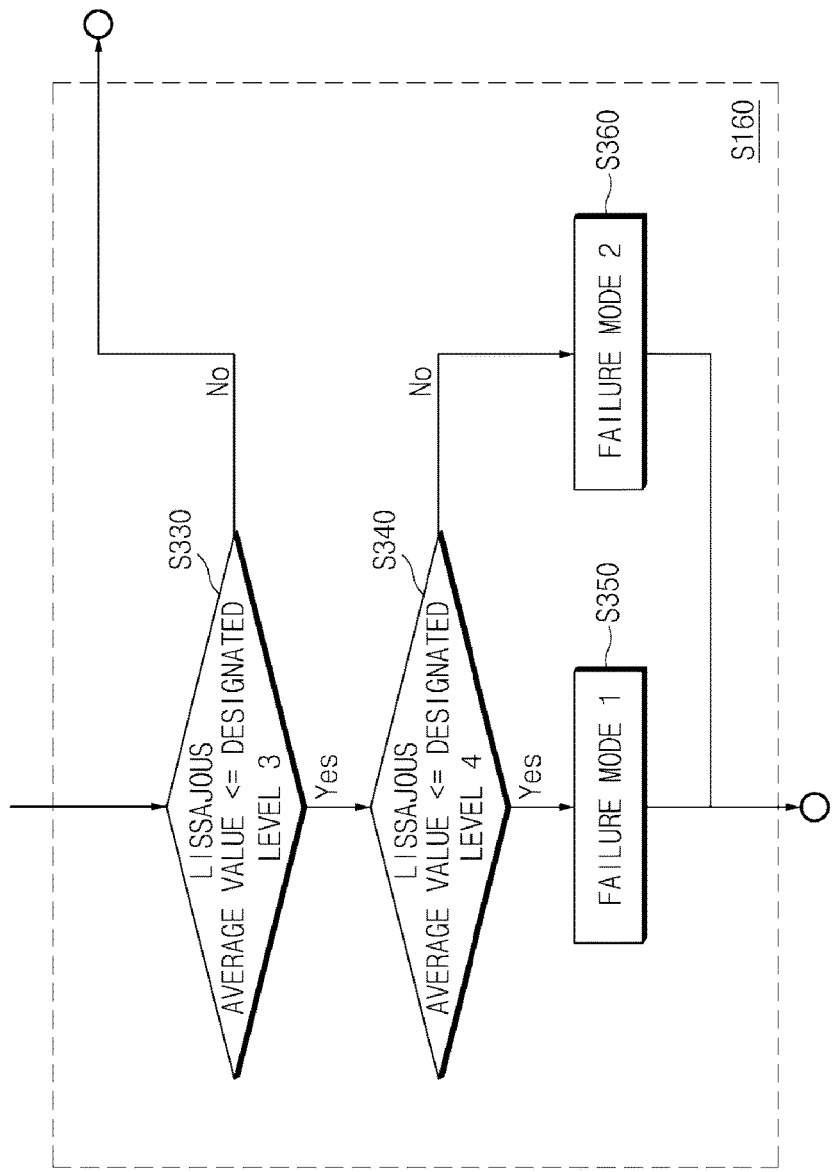
FIG. 6 is an exemplary flow chart showing a sequence for determining a failure based on a Lissajous value of the method for determining a failure in a resolver according to an exemplary embodiment of the present disclosure.

FIG. 6, which is an exemplary flow chart showing a sequence for determining a failure based on a Lissajous value of the method for determining a failure in a resolver according to an exemplary embodiment of the present disclosure, specifically describes S160 as shown in FIG. 4.

Referring to FIG. 6, when the Lissajous average value is the designated Lissajous value level or greater, whether the failure maintaining time is equal to or greater than the designated time may be determined. When the failure maintaining time is equal to or takes the longer time than the designated time, a failure may be determined (e.g., failure modes 1 and 2).

Whether the Lissajous average value is less than or equal to the designated level 3 may be determined (S330). However, when the Lissajous average value is greater than the designated level 3, whether the Lissajous average value is the mono signal deviation value or greater may be determined. When the Lissajous average value is less than or equal to the designated level 3, whether the Lissajous average value is less than or equal to a designated level 4 may be determined (S340). Accordingly, when the Lissajous average value is less than or equal to the designated level 4, the failure may be determined (e.g., failure mode 1) (S350). However, when the Lissajous average value is greater than the designated level 4, the failure may be determined (e.g., failure mode 2) (S360).

Figure 7:
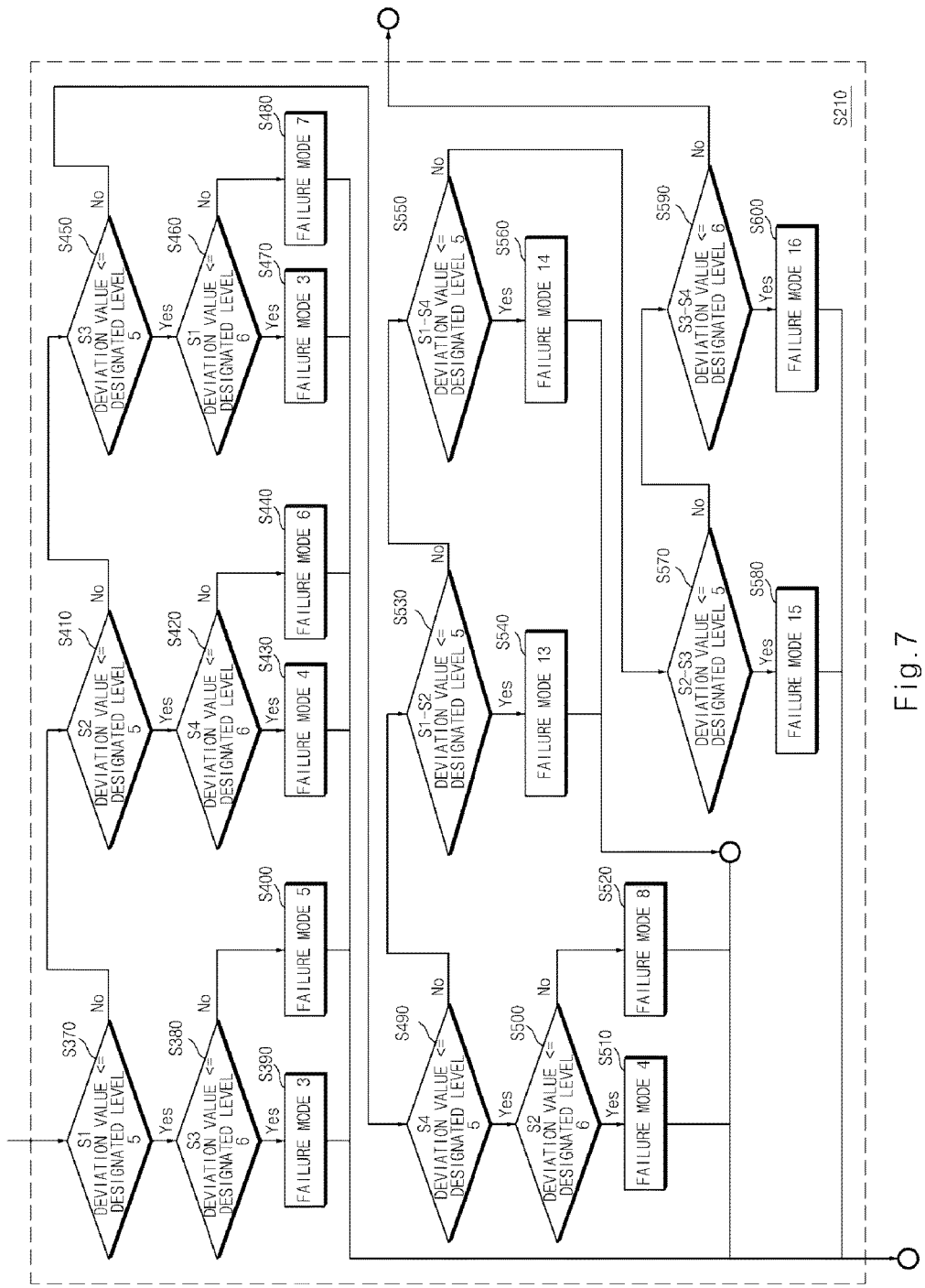
FIG. 7 is an exemplary flow chart showing a sequence for determining a failure based on a mono signal deviation value of the method for determining a failure in a resolver according to an exemplary embodiment of the present disclosure.

FIG. 7, which is an exemplary flow chart showing a sequence for determining a failure based on a mono signal deviation value of the method for determining a failure in a resolver according to an exemplary embodiment of the present disclosure, specifically describes S210 as shown in FIG. 4.

Referring to FIG. 7, in response to determining the motor is rotated and the mono signal deviation value is the designated deviation value level or greater, whether the failure maintaining time is equal to or greater than the designated time may be determined. When the failure maintaining time is equal to or greater than the designated time, a failure may be determined (e.g., failure modes 3 to 8 and 13 to 16).

More specifically, whether the mono signal deviation value is the designated deviation value level or greater may be determined as follows. Whether an S1 deviation value is less than or equal to a designated level 5 may be determined (S370). Further, when the S1 deviation value is less than or equal to the designated level 5, whether an S3 deviation value is less than or equal to a designated level 6 may be determined (S380). When the S3 deviation value is less than or equal to the designated level 6, failure may be determined (e.g., failure mode 3) (S390), and when the S3 deviation value is greater than the designated level 6, the failure may be determined (e.g., failure mode 5) (S400). However, when the S1 deviation value is greater than the designated level 5, whether an S2 deviation value is less than or equal to the designated level 5 may be determined (S410).

Moreover, when the S2 deviation value is less than or equal to the designated level 5, whether an S4 deviation value is less than or equal to the designated level 6 may be determined (S420). When the S4 deviation value is less than or equal to the designated level 6, failure may be determined (e.g., a failure mode 4) (S430), and when the S4 deviation value is greater than the designated level 6, failure may be determined (e.g., failure mode 6) (S440). However, when the S2 deviation value is greater than the designated level 5, whether an S3 deviation value is less than or equal to the designated level 5 may be determined (S450).

When the S3 deviation value is less than or equal to the designated level 5, whether the S1 deviation value is less than or equal to the designated level 6 may be determined (S460). In particular, when the S1 deviation value is less than or equal to the designated level 6, failure may be determined (e.g., a failure mode 3) (S470), and when the S1 deviation value is greater than the designated level 6, failure may again be determined (e.g., failure mode 7) (S480). However, when the S3 deviation value is greater than the designated level 5, whether the S4 deviation value is less than or equal to the designated level 5 may be determined (S490).

In addition, when the S4 deviation value is less than or equal to the designated level 5, whether the S2 deviation value is less than or equal to the designated level 6 may be determined (S500). When the S2 deviation value is less than or equal to the designated level 6, failure may be determined (e.g., failure mode 4) (S510), and when the S2 deviation value is greater than the designated level 6, failure may also be determined (e.g., failure mode 8) (S520). However, when the S4 deviation value is greater than or not equal to the designated level 5, whether S1 and S2 deviation values are less than or equal to the designated level 5 may be determined (S530).

Additionally, when the S1 and S2 deviation values are less than or equal to the designated level 5, failure may be determined (e.g., failure mode 13) (S540). When the S1 and S2 deviation values are greater than or are not equal to the designated level 5, whether the S1 to S4 deviation values are less than or are equal to the designated level 5 may be determined (S550). When the S1 to S4 deviation values are less than or equal to the designated level 5, failure may be determined (e.g., failure mode 14) (S560). However, when the S1 to S4 deviation values are greater than the designated level 5, whether the S2 and S3 deviation values are less than or equal to the designated level 5 may be determined (S570). More specifically, when the S2 and S3 deviation values are less than or equal to the designated level 5, failure may be determined (e.g., a failure mode 15) (S580). However, when the S2 and S3 deviation values are greater than the designated level 5, whether the S3 and S4 deviation values are less than or equal to the designated level 6 may be determined (S590). In particular, when the S3 and S4 deviation values are less than or equal to the designated level 6, failure may be determined (e.g., failure mode 16) (S600).

Figure 8:
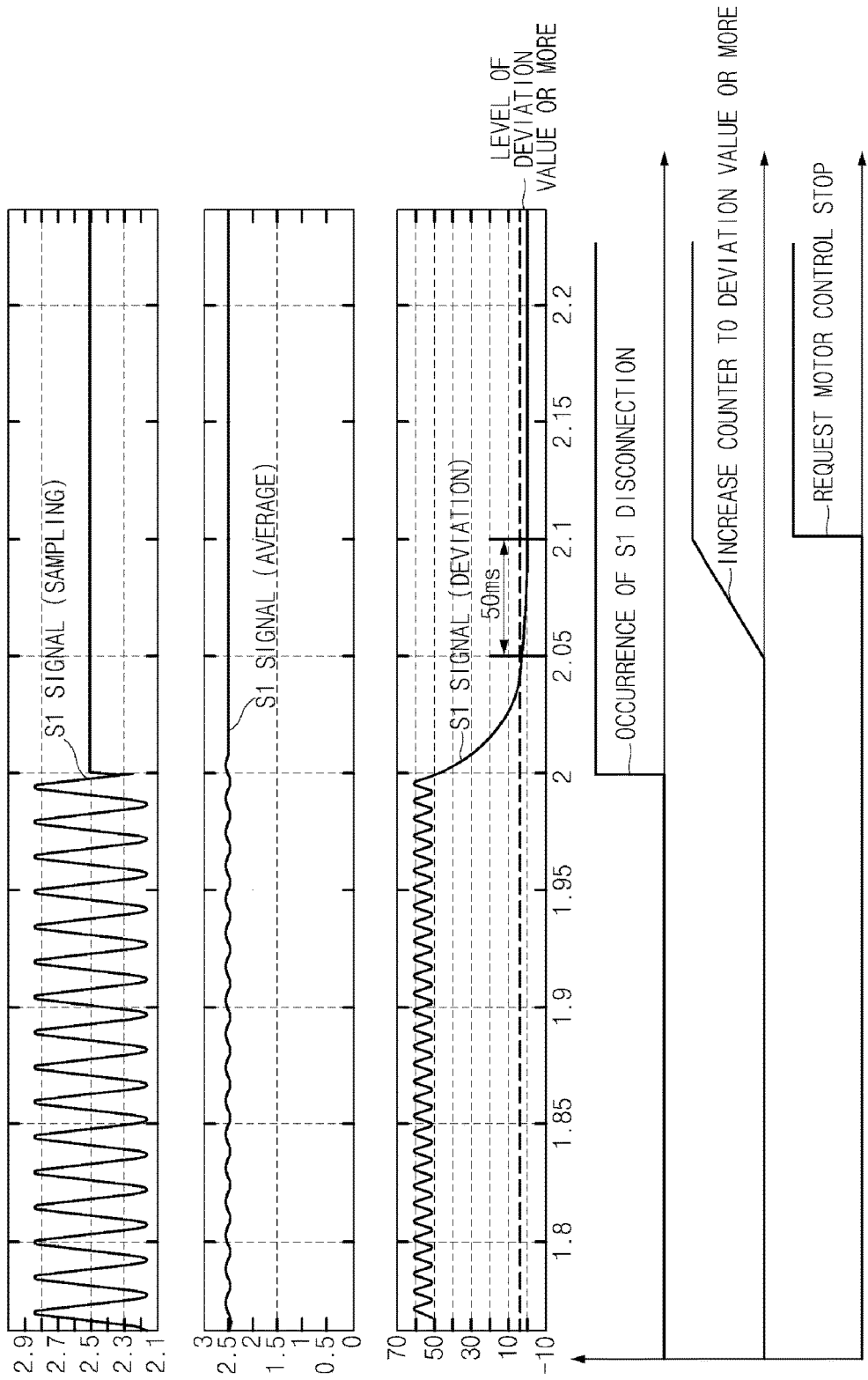
FIG. 8 is an exemplary graph illustrating an example of a failure mode 3 of the method for determining a failure in a resolver according to an exemplary embodiment of the present disclosure.

FIG. 8 is an exemplary graph illustrating an example of a failure mode 3 of the method for determining a failure in a resolver according to an exemplary embodiment of the present disclosure. Referring to FIG. 8, an S1 sampling value, an S1 average value, and an S1 deviation value may be shown, and whether the S1 deviation value is the designated deviation value level or greater may be determined. When the mono signal (S1) deviation value is the designated deviation value level or greater, an S1 disconnection may be indicated and a counter may be configured to increase to the deviation value or more so failure mode 3 may be determined and a motor may be configured to stop.

Figure 9:
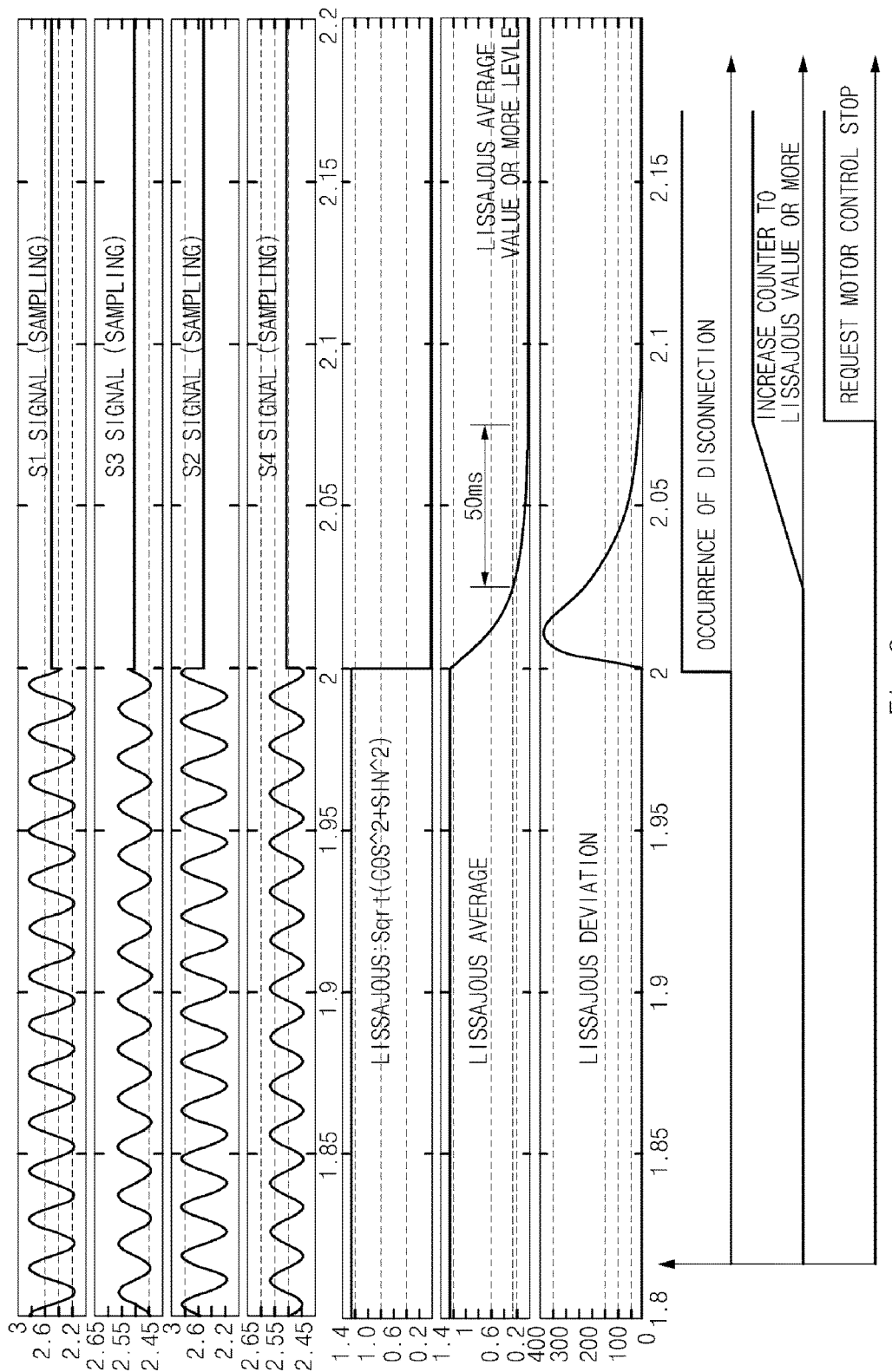
FIG. 9 is an exemplary graph illustrating an example of a failure mode 1 of the method for determining a failure in a resolver according to an exemplary embodiment of the present disclosure.

FIG. 9 is an exemplary graph illustrating an example of a failure mode 1 of the method for determining a failure in a resolver according to an exemplary embodiment of the present disclosure. Referring to FIG. 9, an S1 sampling value, an S2 sampling value, an S3 sampling value, an S4 sampling value, a Lissajous value, a Lissajous average value, and a Lissajous deviation value may be shown, and whether the Lissajous value is the designated Lissajous average value level or greater may be determined. When the Lissajous value is the designated Lissajous average value level or greater, a disconnection may be indicated, and the counter may be configured to increase to the Lissajous value or greater so failure mode 1 may be determined and the motor may be configured to stop.

Figure 10:
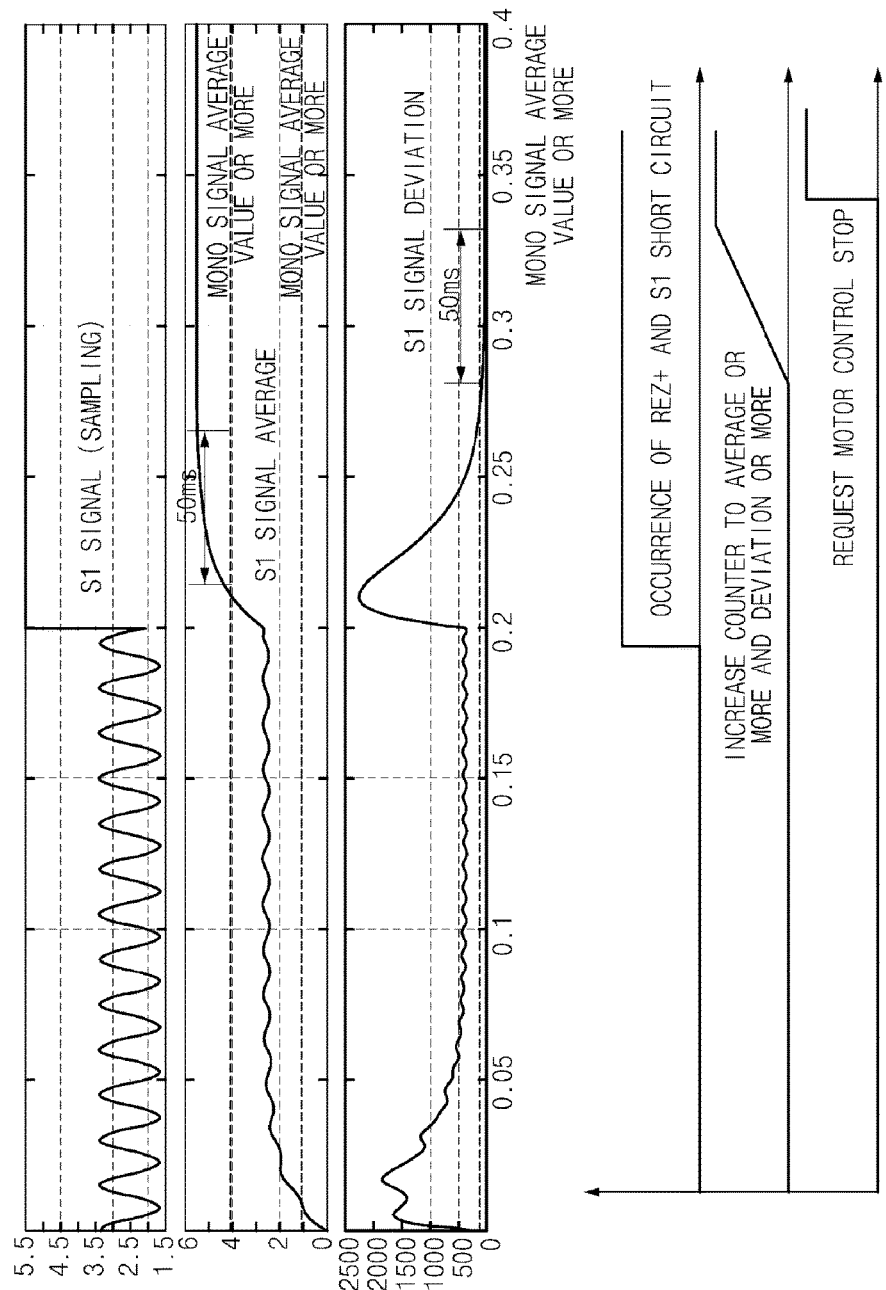
FIG. 10 is an exemplary graph illustrating an example of a failure mode 9 of the method for determining a failure in a resolver according to an exemplary embodiment of the present disclosure.

FIG. 10 is an exemplary graph illustrating an example of a failure mode 9 of the method for determining a failure in a resolver according to an exemplary embodiment of the present disclosure. Referring to FIG. 10, an S1 sampling value, an S1 average value, and an S1 deviation value may be shown, and whether the S1 average value is a mono signal average value or greater may be determined, and whether the S1 deviation value is a mono signal deviation value or greater may also be determined. When the S1 average value is the mono signal average value or greater, an S1 disconnection may be indicated, and the counter may be configured to increase to the average value and the deviation value or more so failure mode 9 may be determined and the motor may be configured to stop.

As described above, according to the present disclosure, the determination in the failure mode which may not be detected by the resolver to digital converter may be performed. Particularly, disconnections/short circuits which may be caused by the resolver connector may be determined.

Although the present disclosure has been described with reference to exemplary embodiments and the accompanying drawings, it would be appreciated by those skilled in the art that the scope of the present disclosure is not limited thereto but various modifications and alterations might be made without departing from the scope defined in the claims and their equivalents.

What is claimed is:

1. A method for determining a failure within a resolver, comprising:
   detecting, by a controller, resolver output signals;
   calculating, by the controller, an average value and a deviation value of the detected signals;
   determining, by the controller, whether the calculated average value and the calculated deviation value is a mono signal average value or greater;
   determining, by the controller, whether the calculated average value and the calculated deviation value is a Lissajous value or greater;
   determining, by the controller, whether the calculated average value and the calculated deviation value is a mono signal deviation value or greater;
   determining, by the controller, a disconnection or a short circuit of the resolver using the calculated average value and deviation value; and
   operating, by the controller, a motor, in which the resolver is disposed, to be stopped in response to detecting the disconnection of the resolver and increasing a counter to the deviation value or greater to determine a failure mode.

2. The method according to claim 1, wherein the output signals are received by a microcomputer.

3. The method according to claim 1, further comprising:
   processing, by the controller, the detected signals as output signals; and
   calculating, by the controller, a plurality of average values and a plurality of deviation values.

4. The method according to claim 1, further comprising:
   determining, by the controller, whether the mono signal average value, among the calculated average value and deviation value is a designated average value level or greater;
   measuring, by the controller, a failure maintaining time when the mono signal average value is the designated average value level or greater; and
   determining, by the controller, failure modes 9 to 12 when the failure maintaining time is equal to a designated time or greater than the designated time.

5. The method according to claim 4, further comprising:
   determining, by the controller, whether the Lissajous average value is a designated Lissajous value level or greater when the mono signal average value is less than the designated average value;
   measuring, by the controller, the failure maintaining time when the Lissajous average value is the designated Lissajous value level or greater; and
   determining, by the controller, failure modes 1 and 2 when the failure maintaining time is equal to the designated time or greater than the designated time.

6. The method according to claim 5, further comprising:
   determining, by the controller, whether the mono signal deviation value is a designated deviation value level or greater when the Lissajous average value is less than the designated Lissajous value;
   measuring, by the controller, the failure maintaining time when the mono signal deviation value is the designated deviation value level or greater; and
   determining, by the controller, failure modes 3 to 8 or 13 to 16 when the failure maintaining time is equal to the designated time or greater than the designated time.

7. A system for determining a failure within a resolver, comprising:
   a memory configured to store program instructions; and
   a controller configured to execute the program instructions, the program instructions when executed configured to:
   detect resolver output signals;
   calculate an average value and a deviation value of the detected signals;
   determine whether the calculated average value and the calculated deviation value is a mono signal average value or greater;
   determine whether the calculated average value and the calculated deviation value is a Lissajous value or greater;
   determine whether the calculated average value and the calculated deviation value is a mono signal deviation value or greater;

determine a disconnection or a short circuit of the resolver using the calculated average value and deviation values; and operating a motor, in which the resolver is disposed, to be stopped in response to detecting the disconnection of the resolver and increasing a counter to the deviation value or greater to determine a failure mode.

8. The system for determining the failure within the resolver of claim 7, wherein the program instructions when executed are further configured to:

process the detected signals as output signals; and calculate a plurality of average values and a plurality of deviation values.

9. The system for determining the failure within the resolver of claim 7, wherein the program instructions when executed are further configured to:

determine whether the mono signal average value, among the calculated average value and deviation value is a designated average value level or greater;

measure a failure maintaining time when the mono signal average value is the designated average value level or greater; and determine failure modes 9 to 12 when the failure maintaining time is equal to a designated time or greater than the designated time.

10. The system for determining the failure within the resolver of claim 9, wherein the program instructions when executed are further configured to:

determine whether the Lissajous average value is a designated Lissajous value level or greater when the mono signal average value is less than the designated average value;

measure the failure maintaining time when the Lissajous average value is the designated Lissajous value level or greater; and determine failure modes 1 and 2 when the failure maintaining time is equal to the designated time or greater than the designated time.

11. The system for determining the failure within the resolver of claim 10, wherein the program instructions when executed are further configured to:

determine whether the mono signal deviation value is a designated deviation value level or greater when the Lissajous average value is less than the designated Lissajous value;

measure the failure maintaining time when the mono signal deviation value is the designated deviation value level or greater; and determine failure modes 3 to 8 or 13 to 16 when the failure maintaining time is equal to the designated time or greater than the designated time.

12. A non-transitory computer readable medium containing program instructions executed by a processor or controller, the non-transitory computer readable medium comprising:

program instructions that detect resolver output signals;

program instructions that calculate an average value and a deviation value of the detected signals;

program instructions that determine whether the calculated average value and the calculated deviation value is a mono signal average value or greater;

program instructions that determine whether the calculated average value and the calculated deviation value is a Lissajous value or greater;

program instructions that determine whether the calculated average value and the calculated deviation value is a mono signal deviation value or greater;

program instructions that determine a disconnection or a short circuit of the resolver using the calculated average value and deviation value; and program instructions that operate a motor, in which the resolver is disposed, to be stopped in response to detecting the disconnection of the resolver and increase a counter to the deviation value or greater to determine a failure mode.

13. The non-transitory computer readable medium of claim 12, further comprising:

program instructions that process the detected signals as output signals; and program instructions that calculate a plurality of average values and a plurality of deviation values.

14. The non-transitory computer readable medium of claim 12, further comprising:

program instructions that determine whether the mono signal average value, among the calculated average value and deviation value is a designated average value level or greater;

program instructions that measure a failure maintaining time when the mono signal average value is the designated average value level or greater; and program instructions that determine failure modes 9 to 12 when the failure maintaining time is equal to a designated time or greater than the designated time.

15. The non-transitory computer readable medium of claim 14, further comprising:

program instructions that determine whether the Lissajous average value is a designated Lissajous value level or greater when the mono signal average value is less than the designated average value;

program instructions that measure the failure maintaining time when the Lissajous average value is the designated Lissajous value level or greater; and program instructions that determine failure modes 1 and 2 when the failure maintaining time is equal to the designated time or greater than the designated time.

16. The non-transitory computer readable medium of claim 15, further comprising:

program instructions that determine whether the mono signal deviation value is a designated deviation value level or greater when the Lissajous average value is less than the designated Lissajous value;

program instructions that measure the failure maintaining time when the mono signal deviation value is the designated deviation value level or greater; and program instructions that determine failure modes 3 to 8 or 13 to 16 when the failure maintaining time is equal to the designated time or greater than the designated time.

* * * * *